F. P. KOBERT.
SUPPLEMENTAL RIM FOR PULLEYS OR BELT WHEELS.
APPLICATION FILED JUNE 1, 1912.
1,062,831.
Patented May 27, 1913.
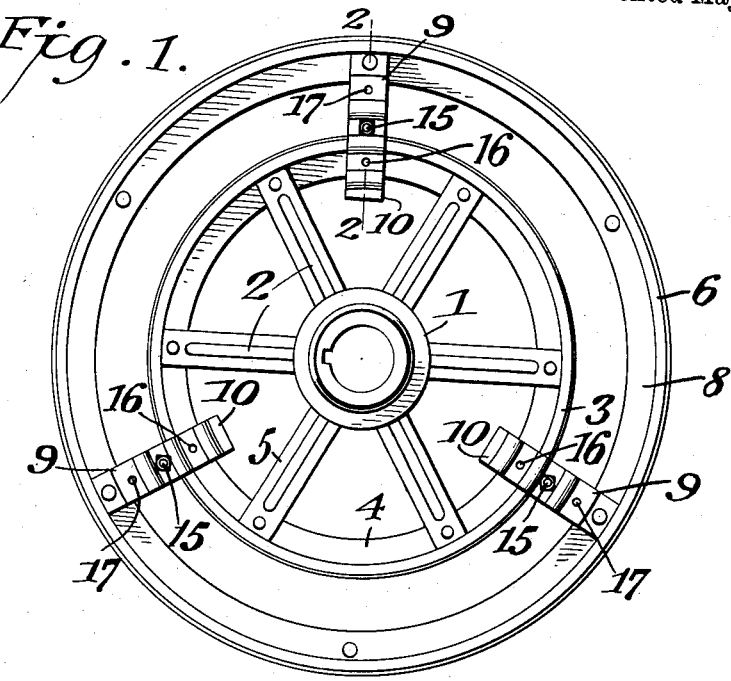
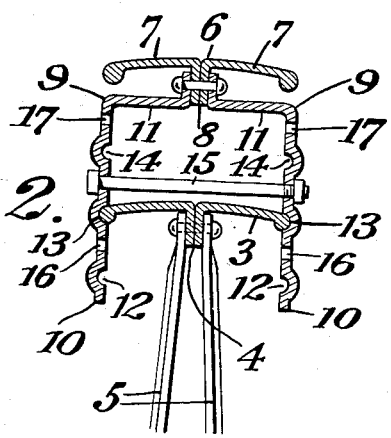

UNITED STATES PATENT OFFICE.

FRANK P. KOBERT, OF FAIRHAVEN, CONNECTICUT.

SUPPLEMENTAL RIM FOR PULLEYS OR BELT-WHEELS.

1,062,831.  Specification of Letters Patent.  Patented May 27, 1913.

Application filed June 1, 1912. Serial No. 700,913.

*To all whom it may concern:*

Be it known that I, FRANK P. KOBERT, a citizen of the United States, residing at Fairhaven, in the county of New Haven and State of Connecticut, have invented certain new and useful Improvements in Supplemental Rims for Pulleys or Belt-Wheels, of which the following is a specification, such as will enable those skilled in the art to which it appertains to make and use the same.

This invention relates to power pulleys or belt wheels, and the object thereof is to provide a supplemental rim for pulleys or wheels of this class, by means of which the diameter of such pulleys or wheels may be increased whenever desired, a further object being to provide a supplemental rim for pulleys or wheels of different transverse dimensions, so as to increase the diameter thereof, and whereby the diameter of pulleys or wheels of this class may be increased whenever desired in order to take up the slack in a belt, or for any other purpose.

The invention is fully disclosed in the following specification of which the accompanying drawing forms a part, in which the separate parts of my invention are designated by suitable reference characters in each of the views, and in which:—

Figure 1 is a side view of what is known as a made-up-steel pulley provided with my improvement, and Fig. 2 a transverse section on the line 2—2 of Fig. 1.

In the drawing forming part of this specification I have shown an ordinary made-up-steel pulley comprising a hub 1, spokes 2 and a rim 3, said rim being composed of two parts the adjacent edges of which are provided with inwardly directed flanges 4 to which the separat parts 5 of the spokes 2 are secured.

In the practice of my invention I provide a supplemental rim 6 which is made in the same manner as the rim 3, said rim 6 being composed of two parts 7 the adjacent edges of which are provided with inwardly directed flanges 8 which are bolted or riveted together, and to which are secured L-shaped radial arms 9 having parallel radial members 10 which extend inwardly toward the hub of the wheel, when the supplemental rim 6 is in use, and the parts 11 which are bolted to the central flanges 8 of said rim 6. The parallel radial members 10 of the L-shaped arms 9 are provided in the inner faces thereof as at 12—13 and 14 with transverse grooves, and in the form of construction shown the rim 3 of the pulley or wheel shown fits in the central grooves 13, and the rim 6 is secured to the rim 3 by means of bolts 15 passed transversely through the parallel parts 10 of the L-shaped arms 9 outside of said rim 3. The L-shaped arms 9 of the supplemental rim 6 form spring clamps or jaws which are securely bound to the rim 3 by the bolts 15, and by means of this construction the supplemental rim 6 may be tightly secured to the rim 3 of the pulley or wheel shown, and a power belt may be mounted on said supplemental rim 6, as will be readily understood. If additional bolts for securing the supplemental rim 6 to the rim 3 are desired they may be passed through the parallel members 10 of the L-shaped arms 9 at 16, inwardly of the rim 3, and other bolts may be passed through the parallel members 10 of the L-shaped members 9 at 17 if desired, but it is believed that in practice the bolts 15 will be sufficient.

By means of my construction the supplemental rim 6, constructed as shown and described, may be applied to pulleys or belt wheels of three different diameters, and as such pulleys or belt wheels are usually made of standard sizes the supplemental rim or its attachment may be made to correspond with these different grades or sizes, and the diameter of a pulley or belt wheel of any dimensions may thus be increased whenever desired.

My invention is not limited to any particular construction of the pulley or belt wheel, nor to any particular construction of the supplemental rim member and its attachments, all that is necessary in this connection, being to provide a supplemental rim for pulleys or wheels of the class specified which may be attached to the rim of said pulleys or wheels for the purpose of increasing the diameter thereof, when necessary.

Having fully described my invention what I claim as new and desire to secure by Letters Patent is:—

1. A supplemental rim for pulleys or belt wheels, said supplemental rim being provided with parallel, inwardly-directed clamp members having spaced grooves, in their inner faces, adapted to receive the side edges of the rim of the pulley or belt wheel, and bolts passed through said clamp members to secure the supplemental rim to the rim of the pulley or belt wheel.

2. The combination with a pulley or belt wheel having the usual rim, of a supplemental rim provided with parallel inwardly-directed side clamp members having spaced grooves in their inner faces adapted to receive the side edges of the rim of the pulley or belt wheel, and bolts passed through said clamp members to secure the supplemental rim to the rim of the pulley or belt wheel.

In testimony that I claim the foregoing as my invention I have signed my name in presence of the subscribing witnesses this 28th day of May 1912.

FRANK P. KOBERT.

Witnesses:
S. ANDREWS,
C. MULREANY.